Patented Oct. 13, 1931

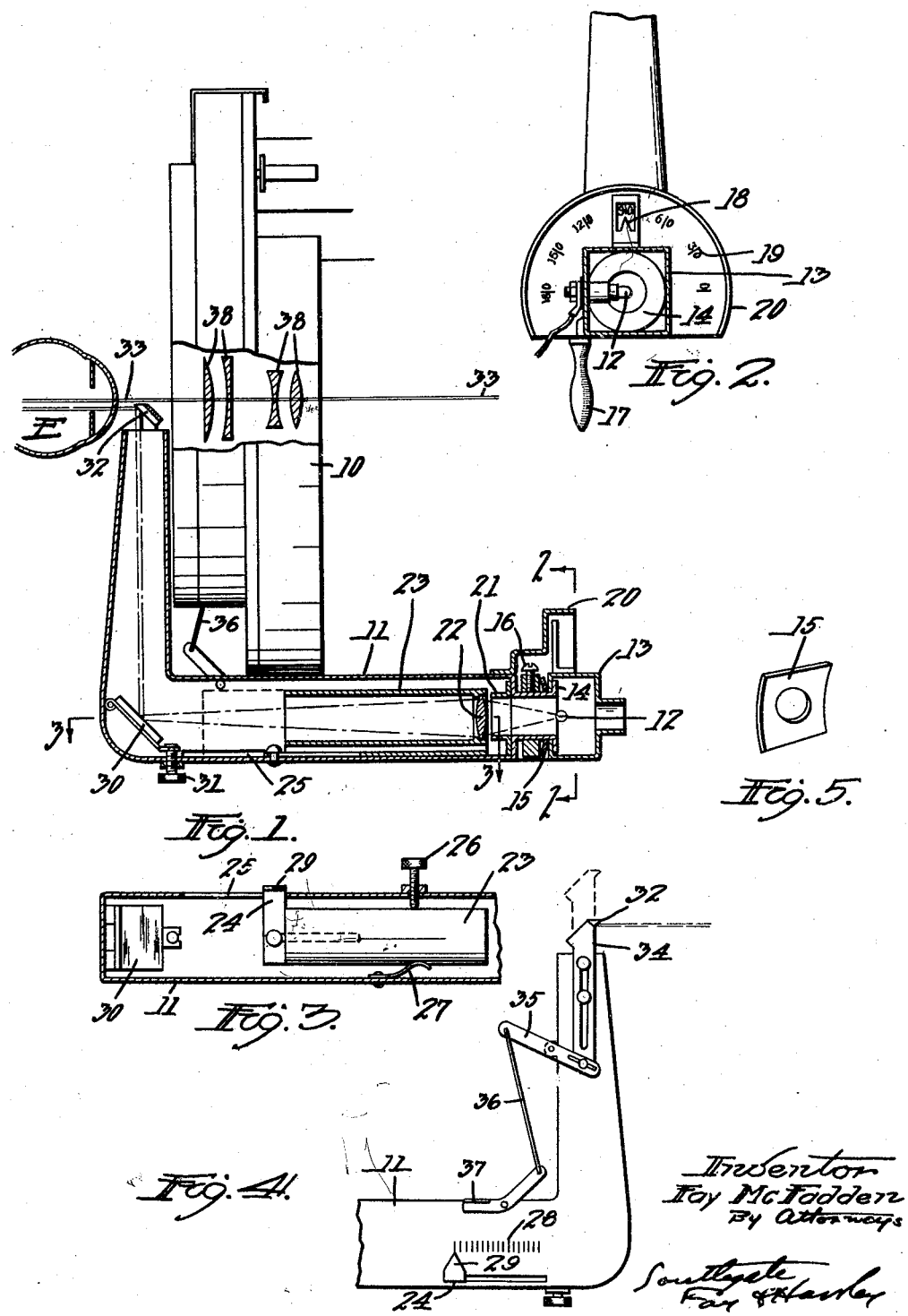

1,827,250

UNITED STATES PATENT OFFICE

FAY McFADDEN, OF RUTLAND, VERMONT

KATOPTER

Application filed May 25, 1928. Serial No. 280,603.

This invention relates to a katopter for application to a phoropter or similar measuring instrument.

The principal objects of the invention are to avoid the difficulties due to the reflected light being projected through identical lenses employed in the eye measuring instrument and receiving the light from the skiascope held in the hand of the user and especially to provide a construction in which the annoyance and difficulty of making estimates when several such measurement lenses are employed, thus increasing the number of reflections from their front and back surfaces, are reduced; also to provide means whereby, even when strong measurement lenses are necessary, the great dispersal or wasting of the power of the light will not prevent the use of the measuring instrument on such myopic cases, thus rendering the use of the measuring instrument practicable for use in such cases, and to provide a construction in which light from a suitable source is reflected into the eye of the patient and the direction adjusted without passing through the lenses of the measuring instrument and without losing its effect or obscuring the effect of the measuring instrument itself. After such a beam of light falls on the eye of the patient it is retransmitted by the optical properties of the eye, thence falling upon the observation or measurement lenses, from the farther side of which lenses it proceeds to the eye of the examiner.

Other objects and advantages of the invention will appear hereinafter.

Reference is to be had to the accompanying drawings in which

Fig. 1 is a side view of part of an ordinary measuring instrument with a preferred embodiment of my katopter shown in central section as applied thereto;

Fig. 2 is a sectional view on the line 2—2 of Fig. 1;

Fig. 3 is a horizontal sectional view on the line 3—3 of Fig. 1;

Fig. 4 is a side view of the reverse side of the katopter, and

Fig. 5 is a perspective view of a detail.

Heretofore, in the use of the usual measuring instruments for the eye, many difficulties have been encountered due to the reflected light being provided through the identical lens used in the eye lenses, this lens receiving light from the instrument held in the hand of the user. These lenses receive the light from the front and form strong reflectors in the front and rear surfaces. Particularly when several such measurement lenses are employed the number of reflections becomes very annoying and likewise make the estimates with measurement lenses exceedingly difficult or impossible. This is due to the fact that the intensive brilliant points of reflected light far exceed the luminosity of that of the illumination upon the retina.

In high myopic or hyperopic cases strong measurement lenses are necessary. Their high power due to their curvature as well as their great dispersal or wasting power of light block the entire procedure in this class of lenses. Therefore the instrument is rendered practically useless and it is necessary to revert to primitive methods in such cases.

It is also true that the projected light from the skiascope is modified to a great extent in its passage through the measuring lenses 38. This entrant modification of the projected beam is detrimental to accuracy in proportion to the strength or power of the lenses. With the present invention the entrant beam does not pass through the measuring lenses as heretofore but goes into the examined eye from behind them. Therefore no other modification of the entrant beam will be present upon the examined retina than is intended by the projecting instrument.

I have shown my invention as applied to a measuring instrument 10, it being understood that it is adaptable to measuring instruments of this general character. It can be built into the machine and constitute part of it or applied to it as an attachment, as desired.

In its preferred form it comprises a main frame 11, attached or secured to the measuring instrument 10 in any desired way. It involves a source of light 12 in the form of a special electric lamp mounted in a housing 13 rotatably mounted on a flange 14 at the end of the casing 11 and adapted to be held against rocking axially thereon by a concave cylindrical flexible washer 15 fixed to the housing and the housing is secured in position by a screw 16. This housing is adapted to be turned by a handle 17 on its longitudinal axis and has a pointer 18 for showing its position. The scale is located on an extension 20 on the casing 11. The handle 17 is used to turn the housing 13 and pointer 18 for orientation. On account of the yielding character of the washer 15, the handle 17 can be used also for rocking the housing 13 and lamp out of a position at right angles to the axis of the above mentioned rotation to determine whether the eye is near or far sighted. This washer permits their rocking in one direction but not at right angles thereto.

The housing is circular and cylindrical about a central axis which is shown longitudinal in the present case and a collar 21 is located inside the casing 11 to complete the passage of a beam of light to a lens 22 located in a focusing tube 23. This tube is adapted to slide along the casing 11 being operated by a handle 24 which projects through a slot 25 in this casing. It is adapted to be held in adjusted position by a thumb screw 26 and is adapted to be forced against a spring 27 which will hold the tube in adjustment and cause it to be tilted as the operator may desire. The position of the tube 23 is read on a scale 28 by means of a pointer 29 on the handle 24.

The light from the lamp 12 passes through the lens 22 and is reflected by an objective mirror 30 which is pivoted so that its angular position can be adjusted by a screw 31. Light is then reflected through an ocular mirror 32 into the eye E of the patient. It will be understood that the operator is looking along the line 33—33 into the eye of the patient. This mirror 32 is mounted on a slide 34 guided vertically in the present instance and operated by a lever 35, link 36 and hand lever 37 pivoted on the body 11. In its working position the top of this mirror comes just to the line 33 along which the operator looks into the eye of the patient.

The object in turning the housing 13 and the lamp 12 therein is to change the angle of this lamp which may have a straight line filament or one of a U-shaped construction and thus change the shape of the beam of light reaching the eye. This permits of several tests, as will be obvious to any person skilled in the art. The motion of the tube 23 longitudinally is for the purpose of focusing the lens 32 on a desired point and this tube is mounted to move laterally to a slight degree to change the direction.

In the use of the instrument the operator looks into the patient's eye along the central line 33—33 and through any number of lenses 38 that may be required. The eye is illuminated by the lamp 12 by throwing a straight beam into it or one of any desired shape which can be controlled by the shape of the lamp filament and the position of the lamp in its housing 13 as indicated on the scale 19.

It will be seen that the reflected light through the lenses 38 through which the operator observes the eye is cut off, the several reflections thus encountered in the prior practice are avoided and the estimates or measurements are much less difficult than has been the case heretofore. Furthermore, in high myopic and hyperopic cases the strong lenses required do not affect the focalization character of the entrant beam before entering the eye of the patient and the measuring instrument can be used in many such cases where it was impossible before.

As has been pointed out above the inaccuracy due to the modification of projected beams from the skiascope is practically eliminated. The several parts can be regulated in a simple and convenient manner, colored glasses can be inserted where required and in fact the instrument is capable of modification by ordinary well-known means to secure all the effects that may be desired in this class of testing. The ocular mirror can be raised out of the way, out of the range of the examined eye when not being used. I have described particularly the mechanism for accomplishing that result.

Although I have illustrated and described only one form of the invention I am aware of the fact that modifications can be made therein by any person skilled in the art without departing from the scope of the invention as expressed in the claims. Therefore, I do not wish to be limited in these repects. But what I do claim is:

1. In a device of the character described, the combination with a frame and a source of light located therein, of a focusing tube in said frame having a lens through which the light from the source passes, means for moving the tube forward and back, means for tilting it to change its direction and mirrors for reflecting the light into the eye of the patient.

2. In a device for attachment to a measuring instrument, the combination with a frame connected with the measuring instrument, a source of light carried by the frame, a lens for directing the beam of light therefrom, a pivotal mirror in said frame for receiving the beam of light, means for adjusting the mirror about its pivot and a second mirror arranged at the back of the measuring instrument for directing the beam of light from the first mirror into the eye of the patient.

3. In a device for attachment to a measuring instrument, the combination with a frame adapted to be located on the measuring instrument and provided with a horizontal and vertical hollow portion, a reflecting mirror at the top of the vertical portion and outside it and located slightly out of line from the lenses of the measuring instrument, a source of light carried inside the horizontal part of the frame, a slanting mirror carried within the frame at the point where the horizontal and vertical parts join for directing light from the source of light to the first named mirror and into the eye of the patient.

4. In an instrument of the character described, the combination with a casing having a main or horizontal part and a transverse part, both parts being hollow, of a lamp housing rotatably mounted on the open end of the horizontal part of the casing, a source of light carried by said housing, a lens in the path of the rays of light from said source, a mirror carried by the casing on its transverse part for reflecting the light into the eye of the patient, a slanting mirror for reflecting the light from the lens to the first named mirror an inside tube supporting said lens and means for adjusting said tube laterally to change the angle of the lens.

In testimony whereof I have hereunto affixed my signature.

FAY McFADDEN.